United States Patent

[11] 3,542,222

[72] Inventor Bertram B. Reilly
 17 Briar Cliff Road, Pittsburgh,
 Pennsylvania 15202
[21] Appl. No. 776,910
[22] Filed Nov. 19, 1968
[45] Patented Nov. 24, 1970

[54] MATERIAL HANDLING APPARATUS
 12 Claims, 5 Drawing Figs.
[52] U.S. Cl. .................................................. 214/130,
 214/772
[51] Int. Cl. ..................................................... B66c 23/00
[50] Field of Search ........................................... 214/772,
 130, 131, 35, 769, 773

[56] References Cited
 UNITED STATES PATENTS
1,115,241 10/1914 Peterson ...................... 214/130
872,735 12/1907 Knutson ....................... 214/130

Primary Examiner—Hugo O. Schulz
Attorney—Parmelee, Utzler & Welsh

ABSTRACT: A material handling apparatus comprising a delivery chute pivotally supported at its discharge end for movement in a vertical arc and having a material receiving bucket at its rear end which is pivotally supported thereon for movement in a vertical arc relatively thereto is disclosed. Means are provided for effecting movement of the chute. Means actuated by movement of the chute holds the bucket in a material retaining position when the chute is being raised and moves the bucket from its material retaining position to a material discharge position as the chute reaches its uppermost limit of movement whereupon the contents of the bucket are discharged into the chute.

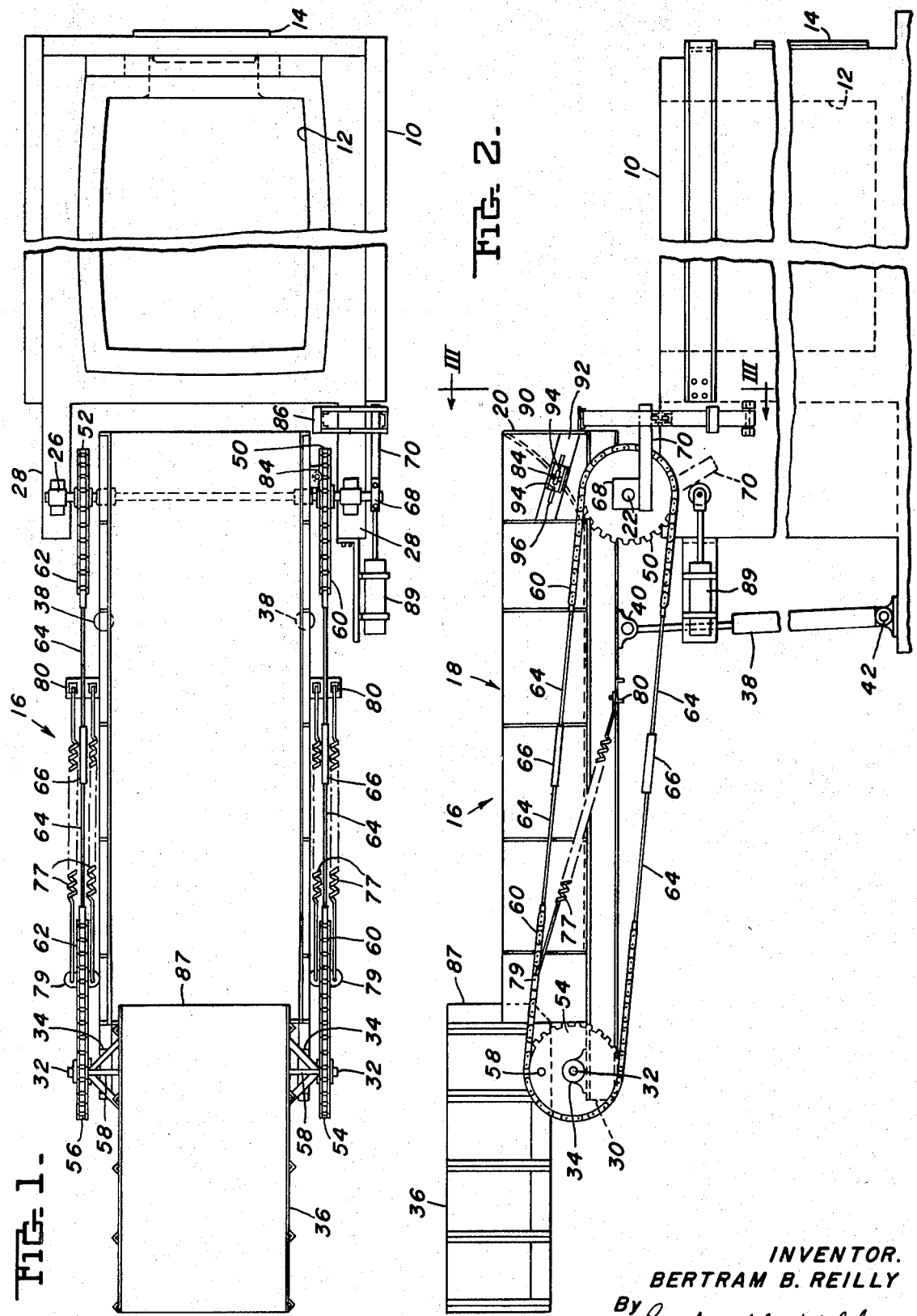

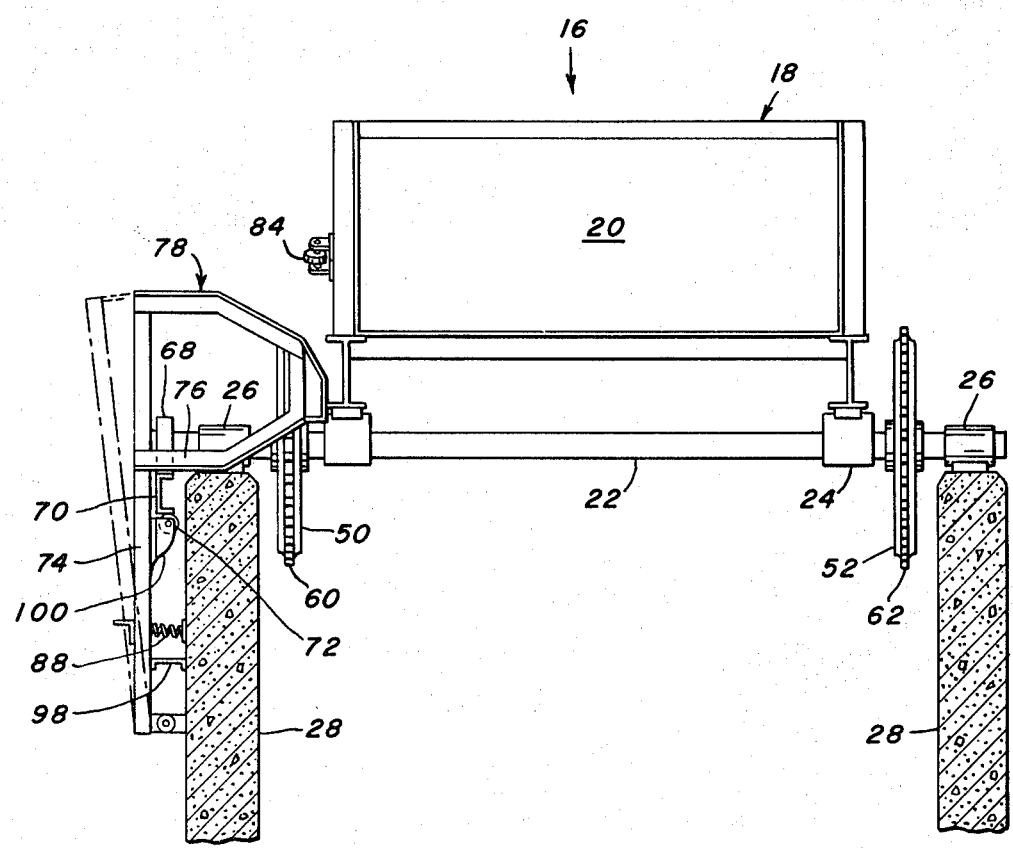

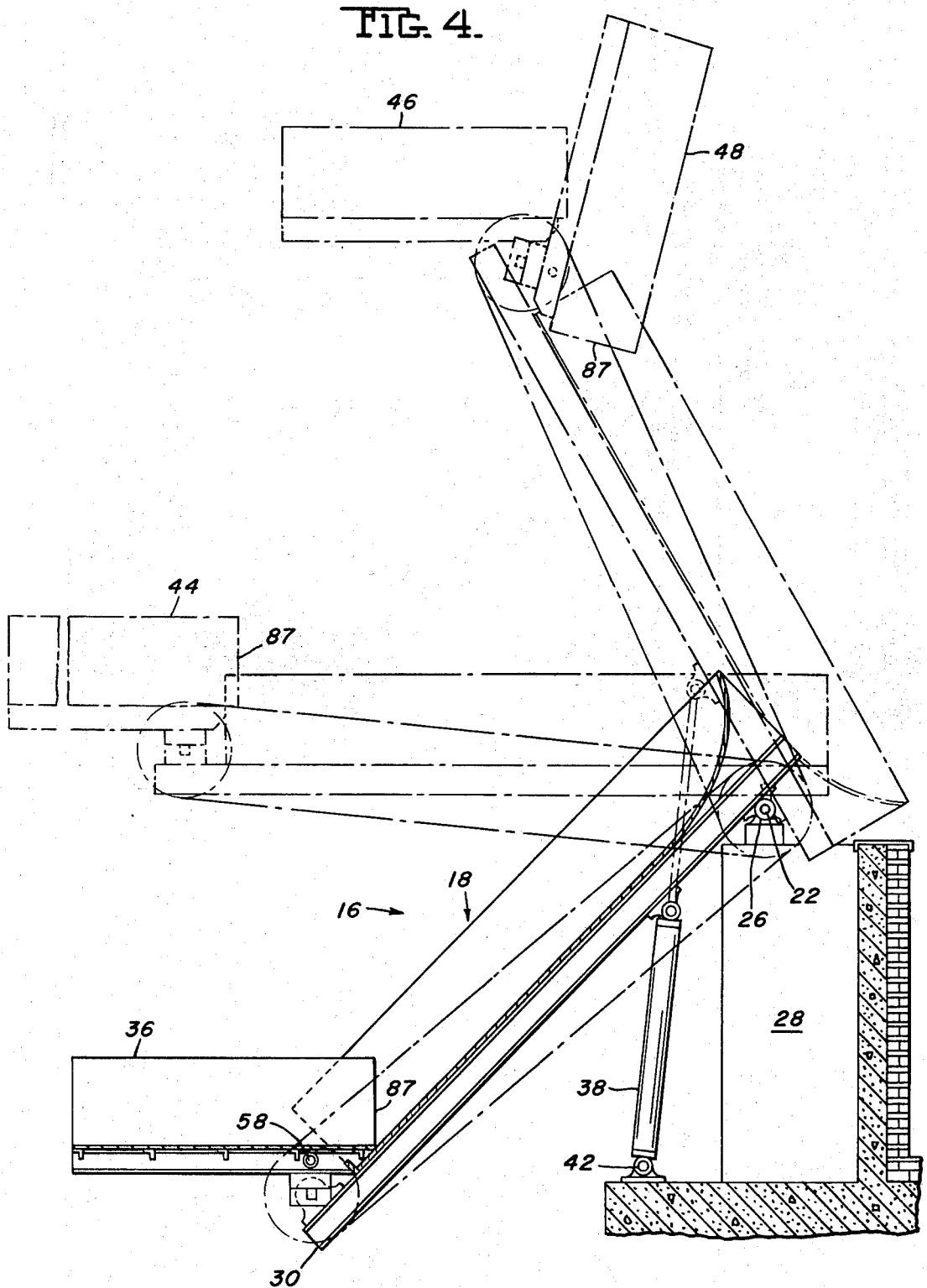

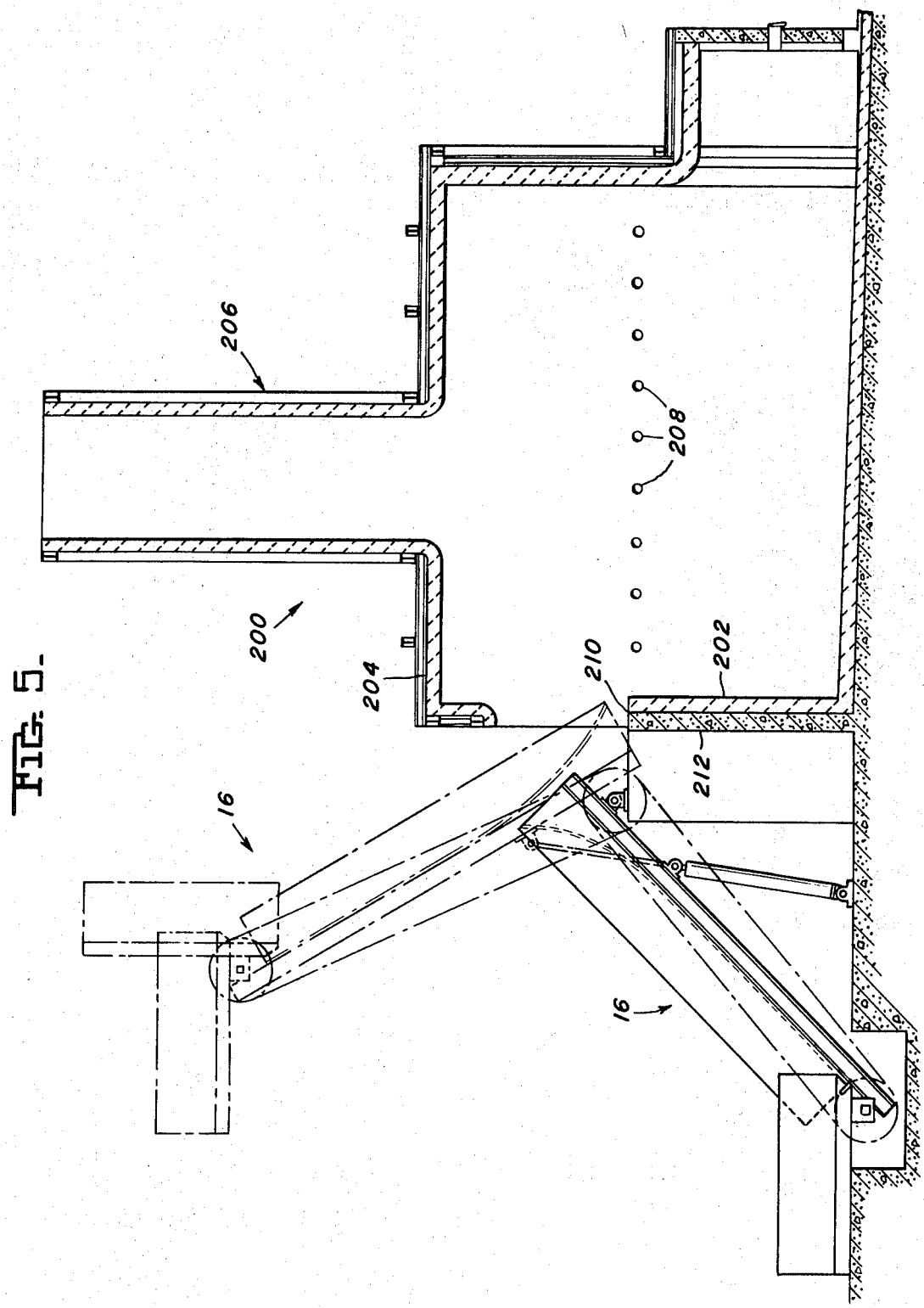

3,542,222

MATERIAL HANDLING APPARATUS

FIELD OF THE INVENTION

This invention relates to material handling apparatus and more particularly to charging apparatus for charging materials into a receptacle. The invention will here be described in most detail in association with a trench or pit-type incinerator since the apparatus according to the invention has been particularly developed for use with such incinerators. However, the apparatus may be used in other environments for which such an apparatus would be appropriate. It might perhaps be used for the introduction of scrap or other materials into an open-hearth furnace, or the charging of scrap into a basic oxygen furnace, or perhaps in some cases, for loading trucks with bulk materials similarly to a high-lift dump bucket.

BACKGROUND AND PURPOSE OF THE INVENTION

By way of background, it may be explained that the trench or pit type incinerator has received favorable consideration for burning industrial waste materials containing explosive or highly volatile components, and for the destruction of useless scrap wood derived from the demolition of buildings. The trench incinerator is essentially a refractory lined, open pit which may be sunken in the ground or above ground. A row of high velocity nozzles are provided adjacent one side of the open pit and these blow air angularly into the pit, supplying a surplus of air, and creating a swirling flame. Industrial wastes of many types can be burned in such apparatus with little visible smoke.

However, one difficulty with these incinerators is that many types of industrial waste burn with intense heat especially with the high velocity air being supplied to the pit. While the intense heat is desirable for eliminating smoke and fumes, the operator must let the material burn down to a low level before he can approach the pit closely enough to charge more combustible material into the pit. It is when the supply of combustible materials begins to get low that objectionable smoke is produced, because the intensity of the heat diminishes and the smoke is less effectively consumed.

Another disadvantage with such incinerators arises in the manner of charging of combustible material therein. Generally, the charging is effected by means of a vehicle, either a dump truck or a high-lift, dumping the material into one end of the incinerator. This results in the material forming in a heap or pile at the bottom of the charging end of the incinerator and not being distributed as it should be for efficient burning.

SUMMARY OF THE INVENTION

Briefly, the present invention provides a charging apparatus comprising a movable chute which is hinged or pivoted to a fixed support at one end adjacent the incinerator and is provided with hydraulic piston and cylinder units to vary the angle of incline of the chute through a vertical arc. A charging bucket or platform is attached to the chute at the end opposite to the hinge. By means of a chain and sprocket system, the bucket is maintained in a substantially horizontal position regardless of the incline of the chute, until the chute reaches a predetermined angle of incline at which point a tripping mechanism releases spring forces causing the bucket to rotate to a substantially vertical position whereupon material in the bucket is unloaded therefrom to the steeply inclined chute which directs it into the incinerator. The discharge end of the chute is preferably curved to redirect the material to a more nearly horizontal plane to aid in distribution of material in the incinerator without substantial exposure of the chute to the heat of the incinerator.

By reason of its construction and mode of operation, the present invention provides an apparatus for feeding or charging material into an incinerator and effectively distributing it therein. The present invention also provides an apparatus for charging the incinerator at any time even during periods of maximum combustion temperature in the incinerator, thus avoiding cooling cycles between charges and resulting smoking, while at the same time permitting the operator to be sufficiently removed from the pit to avoid the intense heat. Also, it provides a means of elevating the material for above grade construction of the incinerator.

The delivery and distribution of the combustibles according to the present invention is accomplished from one end of the incinerator without requiring the insertion of the feeding apparatus into the incinerator. This permits the incinerator, if desired, to be substantially enclosed or hooded and provided with a vent stack instead of being completely open at the top as in the case of a conventional trench incinerator, which is not practical where a device such as a dump truck or high-lift is used.

As compared to an open trench incinerator, an enclosed incinerator provided with a stack has numerous advantages. The stack serves to conduct the combusted gases above ground level and ground level wind currents thereby greatly increasing the comfort and safety of personnel in the vicinity of the incinerator. The enclosing structure serves to contain sparks and burning combustibles and reduce likelihood of them being carried in the exiting gas stream from the incinerator. Higher combustion temperatures can be achieved due to the greater proportion of reflected or reradiated heat within the enclosure, permitting the incineration of material having a wider range of moisture and heat content. Finally, the enclosure provides a greater protection of the refractory lining materials of the incinerator from unfavorable weather conditions such as rain or snow, thus reducing the maintenance work and cost for refractory material.

A more complete understanding of the invention will become apparent from the following description, taken in conjunction with the embodiment of the invention.

BRIEF DESCRIPTION OF THE DRAWINGS

FIG. 1 is a plan view of the charging apparatus according to the invention illustrating the same in association with an open pit-type incinerator;

FIG. 2 is a view in side elevation of the apparatus shown in FIG. 1 illustrating the chute, bucket and associated parts in an intermediate position between raised and lowered positions;

FIG. 3 is a transverse section taken along the line III—III of FIG. 2;

FIG. 4 is a view in longitudinal section of the apparatus shown in FIGS. 1—3 illustrating somewhat diagramatically the operation of the apparatus wherein the chute is inclined downwardly for loading material into the bucket and then tilted upwardly through an intermediate position to a steeply-inclined position where material will slide down the chute into the incinerator; and FIG. 5 is a longitudinal section through a modified pit incinerator provided with a charging apparatus according to the present invention and illustrating the modified pit incinerator enclosed or hooded and provided with a vent stack.

DESCRIPTION OF THE PREFERRED EMBODIMENT

Referring now to the drawings wherein like reference numerals refer to like parts throughout the several views, 10 indicates an open pit type incinerator of the usual construction. The open pit incinerator per se forms no part of the present invention but basically consists of an elongated refractory lined pit 12 which is here shown constructed above the ground level. A door 14 is provided at the end of the incinerator 10 to provide access thereto for the removal of incinerated ash material. A row of high velocity nozzles (not shown) is generally provided adjacent one side of the pit to blow air angularly downward into the pit to intensify combustion and to provide a surplus of air.

A material handling apparatus or trench feeder is shown generally at 16 for feeding material into the incinerator 10 wherein the operator can be sufficiently removed from the pit to avoid the intense heat generated therein. The feeder or charging apparatus 16 comprises a delivery chute designated generally as 18, which as best seen in FIG. 3 is pivotally supported adjacent its front or discharge end 20 on a first shaft 22 by bearings 24 so that it may rotate in a vertical arc about the longitudinal axis of the shaft 22. The shaft 22 is in turn supported in bearings 26 provided on fixed supports 28 which are here shown as extensions of the side walls of the incinerator 10.

At the outer or rear end 30 of the chute 18 there is a second shaft 32 that is supported for rotation relative to the chute and to shaft 22 in bearings 34 carried on the chute 18. A material receiving or charging bucket 36 is nonrotatably secured to the shaft 32 to permit the second shaft 32 and the bucket 36 to pivot or rotate as a unit in a vertical arc with respect to the chute 18 and about the longitudinal axis of the shaft 32.

A pair of hydraulic cylinder and piston units 38 are pivotally connected to the chute 18 at 40 and to a foundation as for example an extension at the base of the incinerator at 42. These units 38 serve as power means for effecting movement of the bucket and chute as a unit in a vertical arc about the longitudinal axis of the shaft 22 between a lower material receiving position as shown in full lines in FIG. 4 and a raised discharge position indicated in broken lines in the same FIGS.

As seen in FIG. 4, the bucket 36 is held or maintained in a horizontal material retaining position as the chute is being raised and lowered as indicated by the dashed lines at 44 and 46; and, as the chute 18 reaches a predetermined uppermost limit of movement, where the chute will be inclined downwardly toward its discharge end 20, the bucket 36 is tilted relatively to the chute 18 towards a vertical material discharge position, as indicated at 48, to thereby discharge its load of material into the chute 18. To this end, means actuated by movement of the chute are provided.

On the opposite ends of the shaft 22 there is provided a pair of first sprocket wheels 50 and 52 which are keyed or otherwise nonrotatably secured to the shaft 22, and on the opposite ends of the shaft 32 there is provided a pair of second sprocket wheels 54 and 56 which are nonrotatably fixed on the shaft 32 and secured to the bucket 36 as by a fastening pin at 58. All four sprocket wheels are identical in pitch diameter and number of teeth. While I might provide a continuous sprocket chain looped around the two sprocket wheels at each side of the chute, I prefer, for economy, to provide partial sprocket chains 60 which are trained around the sprocket wheels 50 and 54 and similar sections of chain 62 which are trained around the sprocket wheels 52 and 56. The respective ends of the partial chains 60 and 62 are connected by cables or rigid links 64 in turnbuckles 66 which are provided to equalize the lengths of the chain and adjust the tension in the sprocket chains.

Nonrotatably secured on the end of the shaft 22 is a block 68 from which projects a rigid, radially extending arm member 70 which is normally held against downward movement by a roller abutment 72 on a strut member 74 pivoted to the incinerator side extension 28. Block 68 and arm 70 are so secured to shaft 22 that the length of arm 70 is in a parallel plane to the floor of bucket 36. The arm member 70 is normally confined against upward movement by a crossbar 76 constituting part of a structure 78, best shown in FIG. 3, that is adjacent the plane in which one side of the chute swings when the chute is moving from the lower position to the upper one. The arm member 70 and strut 74 comprise a releasable latching means in that the strut 74 is pivotally supported to swing to and away from a position blocking movement of the arm member 70 and thus rotation of a shaft 22 for the reason hereinafter explained.

There are two pairs of tension springs 77 having opposite ends with one end of each spring being connected to the upper reach of the sprocket chains as is shown at 79 and the opposite end of each spring is anchored to a fixed point on the bottom of the chute as is shown at 80. The springs 77 serve as a power means for effecting movement of the bucket 36 from a horizontal position to a substantially vertical position as will be understood from the following description of the operation of the apparatus.

Assuming the feeder apparatus 16 to be in a material receiving position i.e., the chute 18 inclined downwardly towards its rear end 30 as shown at the bottom of FIG. 4, the bucket 36 will be in a horizontal position as shown. When the hydraulic jacks 38 are operated to swing the chute up to the steeply-inclined position, shown at the top in FIG. 4, the chute will rotate about the shaft 22 which is held stationary by the arm member 70. Because of the sprocket and chain arrangement, the movement of the chute in this manner about the stationary sprockets 50 and 52 will cause the sprockets 54 and 56 to rotate in a counterclockwise direction thereby rotating shaft 32 and maintaining the bucket 36 horizontal as the chute 18 moves up.

As the chute reaches the steeply-inclined position, shown at the top of FIG. 4, a roller cam 84, provided at the discharge end of the chute, will ride over the surface 86 on the structure 78, pushing the lever or strut 74 outwardly to the dashed-line position. This action will permit arm 70 to move and allow shaft 22 to rotate. The springs 77 which have been put under tension by the upward movement of the chute 18 and the counterclockwise movement of the sprocket wheels 54 and 56, will immediately pull the upper reaches of the sprocket chains to the right as viewed in FIG. 2, rotating sprockets 54 and 56 and shaft 32 clockwise thereby tipping the bucket 36 to a substantially vertical position as shown at 48 at the top of FIG. 4. The contents of the bucket 36 will fall quickly out of the bucket onto the chute and slide down the chute. As the material reaches the curved discharge end of the chute 18, its direction is changed to a more nearly horizontal direction so that the trajectory of different pieces of the material will distribute it over at least a large area lengthwise of the incinerator.

As the bucket 36 tilts to the vertical position, the sprockets 50, 52 and shaft 22 will have of course rotated in a clockwise direction moving arm 70 to the dashed line position shown in FIG. 2. A dash-pot 89 is mounted on the incinerator supports and positioned so as to intercept arm 70 and retard the motion of arm 70 and cushion the impact of the bucket against the rear end of chute 18.

The arrangement provides a mechanism in which the normally fixed sprocket wheels 50—52 are in effect sun gears which are geared to sprocket wheels 54 and 56 as planet gears through the sprocket chains during the raising and lowering of the chute with the planet gears rotating in an opposite rotation to the movement of the chute. The spring stores energy on the upward swing of the chute, which is released when the latch is triggered at the upper limit of travel to then rotate both sets of sprockets in the same direction as the chute moved to reach the highest position.

In order to control the velocity of the material as it enters the incinerator and therefore the distribution of material over the length of the incinerator, the angle of maximum inclination of the chute 18 in the upper position together with the point at which the bucket 36 will tilt to discharge its contents into the chute can be adjusted and predetermined. To this end, the roller, cam 84 is mounted on a slide member 90 which is in turn adjustably secured to a slide base 92 provided on one side of the chute at the discharge end. The slide member 90 is adjustably secured to the slide base 92 by means of fasteners 94 which are received in a slot 96 provided in the slide base 92. By adjustably mounting the roller cam 84 in this fashion, its initial contact with the surface 86 on the structure 78 can be selectively predetermined; the tilting point of the bucket 36 relative to the inclination of the chute 18 can be adjusted, and thus, the velocity of the material as it enters the incinerator can be controlled. This may be desirable to protect the opposite wall of the furnace from impact by heavy low friction combustibles and secure good distribution with high-friction scrap material.

After the charging of material into incinerator 10, jacks 38 are operated to lower the chute and bucket to the lower-most position as shown in FIG. 4 for the next charge. As chute 18 is lowered, bucket 36 will remain in a fixed angular relationship to the chute with the tension in springs 77 acting in opposition to the cantilevered weight of bucket 36. Since spring tension lessens as the chute is lowered because sprockets 50 and 52 and 54 and 56 are free turning, the effective moment of the cantilevered bucket weight increases and a point is reached prior to the bottom loading position at which bucket 36 will tilt back to the horizontal position. Since arm 70 is positioned in a plane parallel to the bucket, it will return to its horizontal, latched position against upper stop bar 76. Lowering of chute 18 immediately moves roller cam 84 away from surface 86, so that a spring 88 pulls strut 74 into its normal position against a stop 98. Thus arm 70 in reassuming the horizontal position moved up against inclined surface 100 and roller 72 causing strut 74 to momentarily swing outward and then back to the vertical latching position against arm 70. When this occurs, sprockets 50 and 52 and shaft 22 are locked against rotation whereupon sprockets 54 and 56 will rotate clockwise with continued lowering of the chute to maintain the bucket horizontal.

Referring now to FIG. 5, the trench feeder 16, as described above, is shown in conjunction with a modified form of pit incinerator. The modified pit incinerator is shown generally at 200 and basically comprises a refractory lined pit 202 having a top enclosing structure 204. A stack is shown generally at 206 and a row of air nozzles is diagramatically shown at 208.

The operation of the feeder 16 is the same as described above, however, material rather than being charged into the charging end of incinerator 200 through an open top as in the case of the open pit incinerator 10, is charged into the incinerator 200 through an opening 210 provided in the end wall 212 of the incinerator. The enclosed incinerator 200 is operated in the same manner as open pit incinerator 10, but with the attendant advantages as outlined previously.

From the foregoing it will be understood that I have provided a charging apparatus for the controlled feeding of material into an incinerator wherein the operator can be safely removed from the pit to avoid the intense heat generated in the incinerator. The apparatus can be readily adapted to incinerator constructions wherein the incinerator is constructed above the ground or sunken into the ground. In the latter case, the lower material receiving position will be that now shown as the intermediate position in FIG. 4. The charging apparatus can be utilized with both open top pit-type incinerators and incinerators having a top enclosure and provided with a vent stack.

I claim:

1. Material handling apparatus having a supporting stand and comprising:
    a. a delivery chute having a rear end and a front discharge end, the delivery chute being pivotally supported about a fixed pivotal mounting in the supporting stand adjacent its discharge end for movement in a vertical arc;
    b. a material-receiving bucket pivotally attached to the rear end of the chute for movement in a vertical arc;
    c. means operatively connected to the chute for raising and lowering the rear end of the chute in a vertical arc; and
    d. means actuated by movement of the chute arranged to hold the bucket in a substantially horizontal material retaining position when the chute is being raised and to move the bucket from its material retaining position to a material discharge position as the chute reaches a predetermined uppermost limit of movement.

2. Material handling apparatus having a supporting stand and comprising:
    a. a delivery chute having a rear end and a front discharge end, the chute being pivotally supported about a fixed pivotal mounting in the supporting stand at its discharge end for movement in a vertical arc;
    b. a material-receiving bucket pivotally attached to the rear end of the chute for movement relatively to the chute in a vertical arc;
    c. means for raising and lowering the chute and bucket as a unit between a lower material-receiving position and a raised discharge position, the chute when in a discharge position being inclined downwardly toward its discharge end; and
    d. means actuated by movement of the chute arranged to hold the bucket horizontal when the chute is being raised and lowered and tilt it upwardly to a substantially vertical position as the chute reaches a predetermined uppermost limit of movement, the bucket being shaped to retain material therein when it is horizontal but to discharge material into the chute as it is tilted relatively to the chute toward a vertical position.

3. A material handling apparatus comprising:
    a. an elongated chute having a rear end and a front discharge end, the chute being supported adjacent its front end on a first shaft by means of bearings to permit the chute to rotate about the longitudinal axis of the first shaft, the first shaft in turn being supported in bearings to permit rotation of the first shaft about its longitudinal axis;
    b. a bucket having a rear end and a front discharge end, the bucket being nonrotatably secured to a second shaft that is supported in bearings on the rear end to the chute to permit the second shaft and bucket to rotate as a unit about the longitudinal axis of the second shaft;
    c. power means operatively connected to the chute for effecting movement of bucket and chute in a vertical arc as a unit about the longitudinal axis of the first shaft between a lower material receiving position and a raised material discharge position; and
    d. means actuated by movement of the chute and bucket about the axis of the first shaft for maintaining the bucket in a horizontal position as the bucket and chute are being raised and lowered and for rotating the bucket in a vertical arc to a substantially vertical position as the chute reaches a predetermined uppermost limit of movement.

4. A material handling apparatus as defined in claim 3 wherein said last named means includes at least one sprocket wheel nonrotatably secured to each of the first and second shafts, a sprocket chain trained around the sprocket wheels and at least one tension spring having opposite ends with one end being connected to the upper reach of the sprocket chain and its opposite and connected to the chute.

5. A material handling apparatus comprising:
    a. an elongated chute having a rear end and a front discharge end, the chute being pivotally supported at its front end, for movement in a vertical arc between lowered and raised positions;
    b. a bucket having a rear end and a front discharge end, the bucket being pivotally connected to the chute adjacent the rear end of the chute for movement with respect thereto in a vertical arc between a horizontal material retaining position and a substantially vertical material discharge position;
    c. first power means operatively connected to the chute for effecting movement thereof;
    d. means operatively connected to the bucket for maintaining the bucket in horizontal position as the chute is being raised and lowered;
    e. second power means operatively connected to the bucket for effecting tilting thereof to a substantially vertical position as the chute reaches a predetermined uppermost limit of movement;
    f. releasable latching means arranged to effectively restrain operation of the second power means such that the bucket will not be tilted until the chute reaches its uppermost limit of movement; and
    g. means on the chute cooperable with the latching means to release the latching means for effecting operation of the second power means whereby the bucket will be tilted to its discharge position to discharge its contents into the chute.

6. A material handling apparatus as defined in claim 5 wherein the chute is pivotally supported at its front end on a first shaft by means of bearings to allow the chute to rotate about the longitudinal axis of the first shaft and the first shaft is in turn supported in bearings to allow rotation of the first shaft about its longitudinal axis, the bucket being nonrotatably secured to a second shaft that is supported on the rear end of the chute in bearings to allow the second shaft and bucket to rotate as a unit about the longitudinal axis of the second shaft.

7. A material handling apparatus as defined in claim 6 wherein the means operatively connected to the bucket for maintaining the bucket in a horizontal position as the chute is being raised and lowered includes:
   a. a pair of first sprocket wheels each of which is fixed on the opposite ends of the first shaft;
   b. a pair of second sprocket wheels each of which is fixed on the opposite ends of the second shaft; and
   c. a pair of sprocket chains each of which is trained around the respective first and second sprocket wheels on each end of the shafts.

8. A material handling apparatus as defined in claim 7 wherein the releasable latching means comprises a radially extending arm member nonrotatably secured to the first shaft and a strut pivotally supported adjacent the front end of the chute to swing to and away from a position blocking movement of the arm member.

9. A material handling apparatus as defined in claim 8, wherein the second power means comprises a plurality of tension springs each spring being connected at one end to the upper reach of a sprocket chain and at its opposite end to the chute.

10. A material handling apparatus as defined in claim 9, wherein the means on the chute cooperable with the latching means comprises a roller secured to the forward end of the chute which is engageable with the strut as the chute reaches its uppermost limit of movement to move the strut away from its blocking position thereby allowing the first shaft to rotate.

11. Material handling apparatus comprising:
   a. an elongated chute;
   b. a first rotatable shaft on which the forward end of the chute is rotatably mounted for movement of the chute about said shaft in a vertical arc between a low position and a position of maximum elevation;
   c. a second shaft rotatably supported on the chute adjacent its rear end;
   d. a bucket having its forward end overlapping said chute and secured to said second shaft for rotation therewith;
   e. means for raising and lowering said chute in a vertical arc about the first shaft; and
   f. means operatively connecting said two shafts arranged to maintain the bucket horizontal as the angle of inclination of the chute changes and effecting tilting movement of the bucket relatively to the chute to an angle where material in the bucket is discharged into the chute only after the chute is raised to a predetermined angle and restoring the bucket to a horizontal position when the chute is lowered.

12. A material handling apparatus as defined in claim 11 wherein said last named means comprises a gearing connecting the first and second shafts for driving the second shaft when the second shaft is carried in an arc about the first shaft by the raising and lowering movement of the chute and in a direction opposite the direction of rotation of the chute about the first shaft, spring means cooperating with the gearing which is stressed by such rotation of the second shaft, and trigger means actuated by movement of the chute to its maximum elevation for releasing said first shaft for rotation whereby said spring means is effective to then rotate both shafts in the direction in which the chute had rotated about the first shaft in moving to said maximum elevation.